US008190421B2

(12) United States Patent
Fux et al.

(10) Patent No.: US 8,190,421 B2
(45) Date of Patent: May 29, 2012

(54) HANDHELD ELECTRONIC DEVICE INCLUDING TOGGLE OF A SELECTED DATA SOURCE, AND ASSOCIATED METHOD

(75) Inventors: Vadim Fux, Waterloo (CA); Carlo Chiarello, Kitchener (CA); Andrew D. Bocking, Waterloo (CA); Harry R. Major, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/972,853

(22) Filed: Dec. 20, 2010

(65) Prior Publication Data

US 2011/0093255 A1  Apr. 21, 2011

Related U.S. Application Data

(63) Continuation of application No. 11/396,275, filed on Mar. 31, 2006, now Pat. No. 7,881,923.

(51) Int. Cl.
*G06F 17/20* (2006.01)
(52) U.S. Cl. ............. 704/8; 704/2; 715/264; 379/88.05; 379/88.06
(58) Field of Classification Search .................. 704/2, 8; 715/264; 379/88.05, 88.06
See application file for complete search history.

(56) References Cited

U.S. PATENT DOCUMENTS

| | | | | |
|---|---|---|---|---|
| 5,606,498 A * | 2/1997 | Maruta et al. | | 704/7 |
| 6,011,554 A * | 1/2000 | King et al. | | 715/811 |
| 6,307,549 B1 * | 10/2001 | King et al. | | 715/810 |
| 6,341,201 B1 * | 1/2002 | Ishiguro et al. | | 396/56 |
| 6,597,345 B2 * | 7/2003 | Hirshberg | | 345/168 |
| 6,810,272 B2 | 10/2004 | Kraft et al. | | |
| 7,092,771 B2 * | 8/2006 | Retlich et al. | | 700/72 |
| 7,113,904 B2 * | 9/2006 | Litster et al. | | 704/8 |
| 7,296,733 B2 * | 11/2007 | Nguyen | | 235/1 R |
| 7,490,296 B2 * | 2/2009 | Feldman et al. | | 715/780 |
| 7,584,216 B2 * | 9/2009 | Travieso et al. | | 1/1 |
| 2005/0060138 A1 * | 3/2005 | Wang et al. | | 704/1 |
| 2005/0198023 A1 * | 9/2005 | James et al. | | 707/4 |
| 2007/0076862 A1 * | 4/2007 | Chatterjee et al. | | 379/433.06 |
| 2007/0143010 A1 * | 6/2007 | Jensfelt | | 701/208 |

* cited by examiner

*Primary Examiner* — David R Hudspeth
*Assistant Examiner* — Lamont Spooner
(74) *Attorney, Agent, or Firm* — Finnegan, Henderson, Farabow, Garrett & Dunner, LLP

(57) ABSTRACT

A method for enabling input into a handheld electronic device having at least three selectable languages available thereon includes detecting a predetermined input a number of times and switching a selected language between one of the three selectable languages and another of the three selectable languages wherein the another language is an immediately preceding selected language.

5 Claims, 3 Drawing Sheets

HANDHELD ELECTRONIC DEVICE INCLUDING TOGGLE OF A SELECTED DATA SOURCE, AND ASSOCIATED METHOD

This application is a continuation application of U.S. patent application Ser. No. 11/396,275, filed Mar. 31, 2006 now U.S. Pat. No. 7,881,923, the disclosure of which is incorporated herein by reference.

BACKGROUND

1. Field

The disclosed and claimed concept relates generally to electronic devices and, more particularly, to a method for switching among a plurality of languages that are stored on a handheld electronic device.

2. Description of the Related Art

Numerous types of handheld electronic devices are known. Examples of such handheld devices include, for instance, personal data assistants (PDAs), handheld computers, two-way pagers, cellular telephones, and the like. Many handheld electronic devices also feature wireless communication capability, although many such handheld devices are stand-alone devices that are functional without communication with other devices.

Handheld electronic devices are used in a variety of language settings and users can often find themselves writing text in multiple languages. For example, a user might reply to one email message in French and another in English. However, in order to utilize a handheld electronic device's advanced features, such as disambiguation, the user might have to select the language that, for example, corresponds to the language of the original message to which he/she is replying. It would be desirable to meet this need and others in an efficient fashion that makes the handheld electronic device easier to use.

BRIEF DESCRIPTION OF THE DRAWINGS

A full understanding of the disclosed and claimed concept can be gained from the following Description when read in conjunction with the accompanying drawings in which:

DESCRIPTION

The accompanying figures and the description that follows set forth the disclosed and claimed concept in its preferred embodiments. It is, however, contemplated that persons generally familiar with handheld electronic devices will be able to apply the novel characteristics of the structures and methods illustrated and described herein in other contexts by modification of certain details. Accordingly, the figures and description are not to be taken as restrictive on the scope of the disclosed and claimed concept, but are to be understood as broad and general teachings.

When referring to the term "language object" and variations thereof, such designations shall refer broadly to any type of object that may be constructed, identified, or otherwise obtained from one or more linguistic elements, that can be used alone or in combination to generate text, and that would include, for example and without limitation, words, shortcuts, symbols, ideograms, and the like.

When referring to the term "linguistic element" and variations thereof, such designations shall refer broadly to any element that itself can be a language object or from which a language object can be constructed, identified, or otherwise obtained, and thus would include, but not be limited to, characters, letters, strokes, symbols, ideograms, phonemes, morphemes, digits (numbers), and the like.

When referring to the term "window" and variations thereof, such designations by way of example, and not limitation, shall refer to a visualized layer, tile, overlay or other similar variant thereof that is output on a display or screen.

When referring to the term "reduced" and variations thereof in the context of a keyboard, a keypad, or other arrangement of input members, such designations shall refer broadly to an arrangement in which at least one of the input members has assigned thereto a plurality of linguistic elements such as, for example, characters in the set of Latin letters.

When referring to the phrase "chording actuation" and variations thereof, such designations are meant to cover instances when two or more keys are actuated in succession or simultaneously.

For purposes of the description hereinafter, the terms "upper", "lower", "right", "left", "vertical", "horizontal", "top", "bottom", and derivatives thereof shall relate to the disclosed and claimed concept as it is oriented in the figures.

Figure 1:
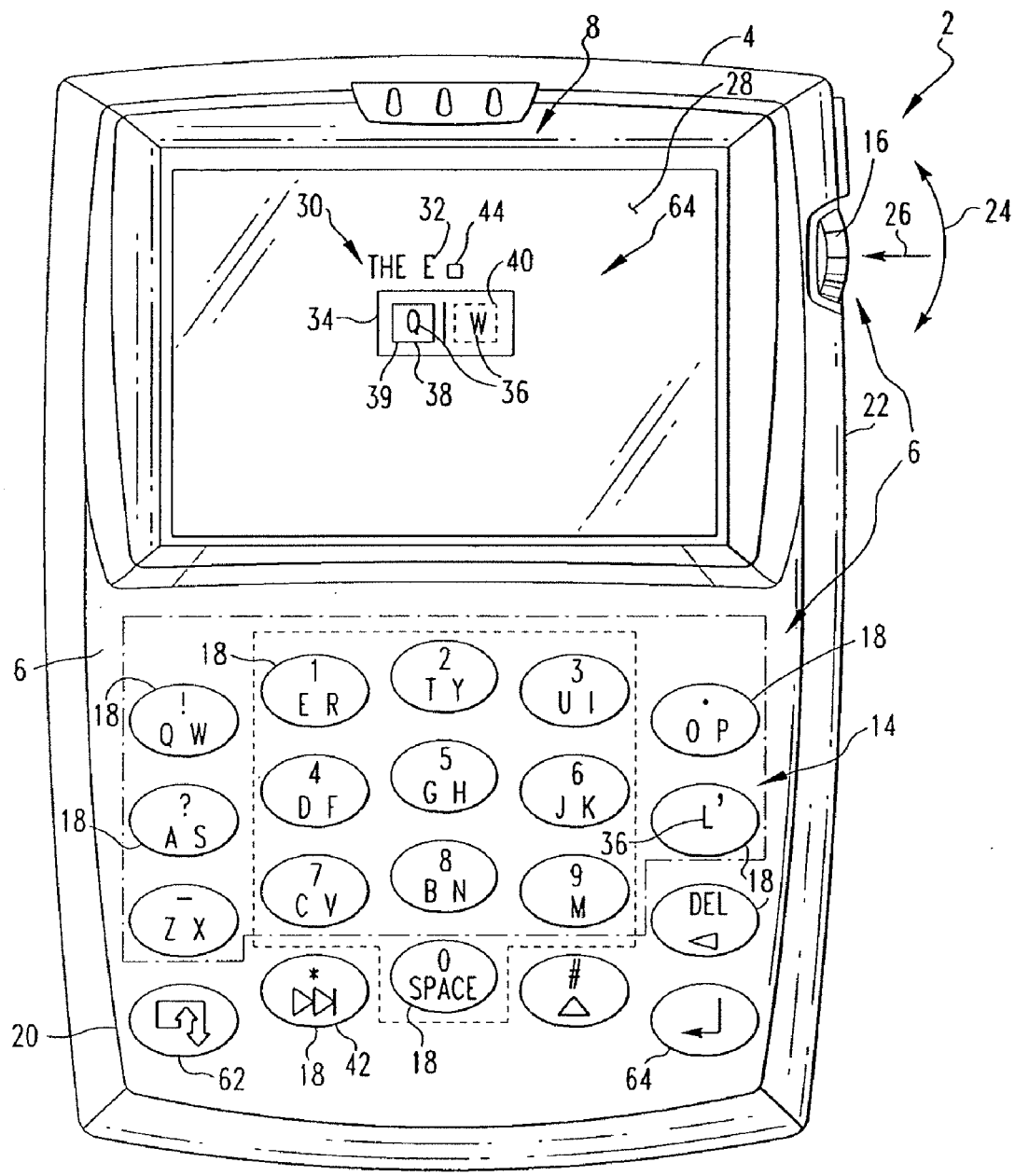
FIG. 1 is a top plan view of an improved handheld electronic device in accordance with the disclosed and claimed concept.
Figure 2:
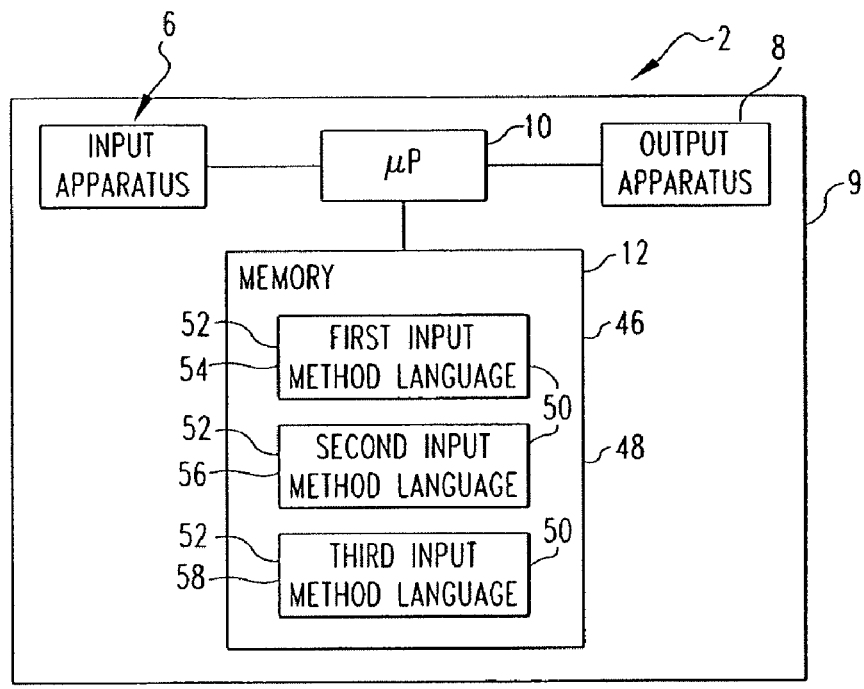
FIG. 2 is a schematic depiction of the improved handheld electronic device of FIG. 1.

An improved handheld electronic device 2 is indicated generally in FIG. 1 and is depicted schematically in FIG. 2. The exemplary improved handheld electronic device 2 includes a housing 4 upon which are disposed a processor unit that includes an input apparatus 6, an output apparatus 8, a processor 10, and a memory 12. The processor 10 may be, for instance, and without limitation, a microprocessor (μP) and is responsive to inputs from the input apparatus 6 and provides output signals to the output apparatus 8. The processor 10 also interfaces with the memory 12. The processor 10 and the memory 12 together form a processor apparatus.

As can be understood from FIG. 1, the input apparatus 6 includes a keypad 14 and a trackwheel 16. As will be described in greater detail below, the keypad 14 is in the exemplary form of a reduced QWERTY keyboard including a plurality of keys 18 that serve as input members. It is noted, however, that the keypad 14 may be of other configurations, such as an AZERTY keyboard, a QWERTZ keyboard, or other keyboard arrangement, whether presently known or unknown, and either reduced or not reduced.

The system architecture of the improved handheld electronic device 2 advantageously is organized to be operable independent of the specific layout of the keypad 14. Accordingly, the system architecture of the improved handheld electronic device 2 can be employed in conjunction with virtually any keypad layout without requiring any meaningful change in the system architecture. It is further noted that certain features set forth herein are usable on either or both of a reduced keyboard and a non-reduced keyboard.

The keys 18 are located on a front face 20 of the housing 4, and the trackwheel 16 is located at a side 26 of the housing 4. In addition to the keys 18, the trackwheel 16 can serve as another input member since the trackwheel 16 is capable of being rotated, as indicated by arrow 24, and depressed generally toward the housing 4, as indicated by arrow 26. Rotation of the trackwheel 16 provides selection inputs to the processor 10, while depression of the trackwheel 16 provides another selection input to the processor 10.

The output apparatus 8 includes a display 28 upon which can be provided an output 30. An exemplary output 30 on the display 28 is depicted in FIG. 1. The output 30 includes a text component 32 and a variant component 34. As can be seen from FIG. 1, the variant component 34 extends substantially horizontally across the display 28. This, however, is not meant to be limiting since the variant component 34 can also extend across the display 28 substantially vertically or in other fashions. Preferably, the variant component 34 is located generally in the vicinity of the text component 32. The variant component 34 includes a number of outputs 36 from which the user can select. The variant component 34 also includes a selection box 38 that appears in a default position 39. As described in commonly owned U.S. patent application Ser. No. 10/931,281 entitled "Handheld Electronic Device with Text Disambiguation," the outputs 36 are proposed by the text disambiguation function as being the most likely disambiguated interpretation of the ambiguous input provided by the user. The selection box 38 is capable of being moved (i.e. shifted) from the default position 39 to a number of different positions 40 by depressing or actuating the <NEXT> key 42 or by rotating the trackwheel 16. The display 28 also includes a caret (i.e. cursor) 44 that depicts generally where the next output will be displayed.

The memory 12 is depicted schematically in FIG. 2. The memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally can include one or more routines depicted generally with the numeral 46 for the processing of data. The routines 46 can be in any of a variety of forms such as, without limitation, software, firmware, and the like. As will be explained in greater detail below, the routines 46 include a routine that can be executed to perform a method in accordance with the disclosed and claimed concept as well as other routines that are utilized by the improved handheld electronic device 2.

Additionally, the memory 12 can also store a variety of data sources 48 such as, without limitation, one or more selectable input method languages (i.e. "language" or "languages") 50 having language objects associated therewith. The input method languages 50 may also have corresponding linguistic sources 52 such as a generic word list or a language rule set. FIG. 2 depicts the memory 12 as containing three input method languages 50. The first input method language 54 can be English, the second input method language 56 can be French, and the third input method language 58 can be Spanish. It is noted, however, that despite FIG. 2 depicting only three input method languages 54, 56, 58 being stored on memory 12, the total number of input method languages 50 that can be stored in the memory 12 is limited only by the memory's 12 capacity. When an input method language 50 is selected, the selected input method language becomes the operative language of the improved handheld electronic device 2. The operative language is the preferred data source for disambiguating ambiguous inputs that are entered into the improved handheld electronic device 2.

Figure 3:
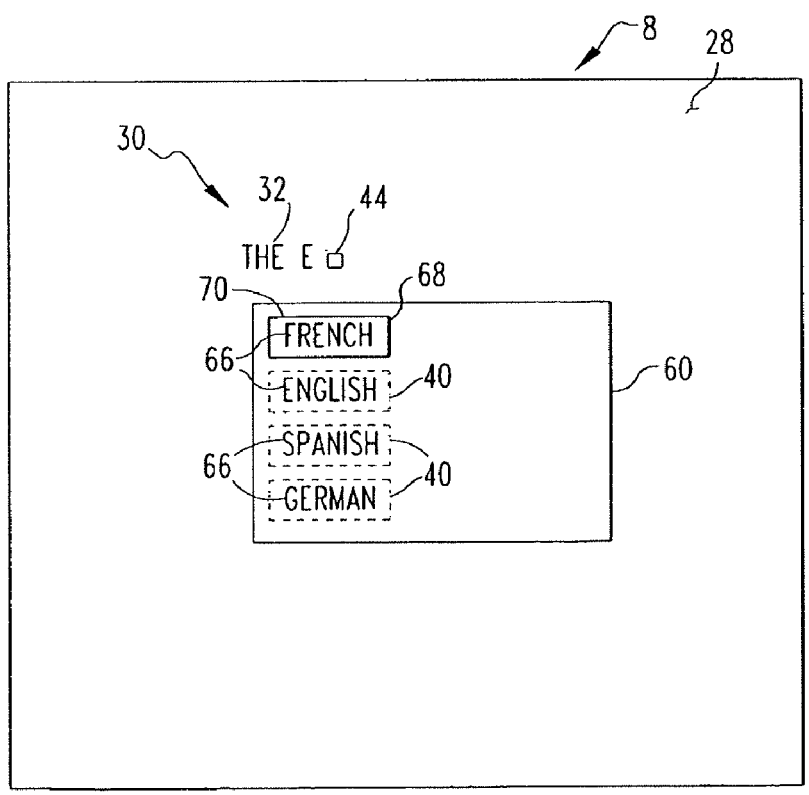
FIG. 3 is a depiction of an output that can be displayed on an output apparatus of the improved handheld electronic device.

Referring to FIG. 3, the languages 50 can be selected from a window 60 that is displayed on the output apparatus 8 upon detection of a predetermined input. The predetermined input can be a chording actuation of at least two input members. For instance, the predetermined input can be a chording actuation of the <ALT> key 62 and the <ENTER> key 64. In another embodiment, the predetermined input can be a press-and-hold actuation of the <ALT> key 62 followed by an actuation of the <ENTER> key 64. In yet another embodiment, the predetermined input can be a press-and-release actuation of the <ALT> key 62 followed by an actuation of the <ENTER> key 64. As can be seen from FIG. 3, the window 60 includes several user-selectable representations 66 of the languages 50 that are available on the improved handheld electronic device 2. The window 60 also includes a selection box 68 that is capable of being moved (i.e. shifted) from the default position 70 to a number of different positions 40 by rotating the trackwheel 16 or by actuating the <NEXT> key 42. A user selects the language that is highlighted in the selection box 68 by either depressing the trackwheel 16 or by actuating the <ENTER> key 64. Upon selection of one of the languages in the window 60, the selected language becomes the operative language of the improved handheld electronic device 2.

In order to prevent the user from unintentionally switching the languages on the improved handheld electronic device 2, a caution window can be displayed that asks the user to confirm whether a language change is desired. The caution window can be displayed immediately after the detection of the predetermined input but prior to displaying the window 60 or the caution window can be displayed after the window 60 has been displayed.

In order to facilitate the entry of text into the improved handheld electronic device 2, the disclosed and claimed concept allows a user of the improved handheld electronic device 2 to rapidly switch between a plurality of languages that are available on the improved handheld electronic device 2. Specifically, the improved handheld electronic device 2 upon detection of a predetermined input will either: switch the operative language to another language wherein the another language is an immediately preceding operative language or switch the operative language to a language that is selected from the window 60. The improved handheld electronic device 2 will switch the operative language to the immediately preceding operative language if the improved handheld electronic device 2 detects a text input, such as an actuation of a key 18 that is assigned to one or more linguistic elements, after the detection of the predetermined input. To illustrate, if the operative language on the improved handheld electronic device 2 is English and the immediately preceding operative language is French, then upon detection of a text input, such as the actuation of the key 18 to which the letter "A" is assigned, the improved handheld electronic device 2 will switch the operative language from English to French. The improved handheld electronic device 2 will switch the current operative language to the language that is ultimately selected from the window 60 if the improved handheld electronic device 2 detects a selection input, such as the rotation of the trackwheel 16 or an actuation of the <NEXT> key 42, after the detection of the predetermined input.

One advantage to the disclosed concept is that the user is able to rapidly switch between languages that are available on the improved handheld electronic device 2 without having to reposition the user's fingers from the keypad 14 because the input members required to execute the predetermined input are located on the keypad 14.

Another advantage to the disclosed concept is that the user does not have to exit the program in which data is being entered in order to change the operative language on the improved handheld electronic device 2 since the change can be implemented by a simple chording actuation of two or more input members.

Yet another advantage to the disclosed concept is that it reduces the amount of time and the number of keystrokes required to implement a language change since the operative language will automatically switch, after the detection of a predetermined input, to an immediately preceding operative language upon the detection of a text input.

To implement the method, the improved handheld electronic device 2 includes one or more routines 46, stored in memory 12 and executable by the processor 10, for switching between multiple languages available on the improved handheld electronic device 2. A flowchart depicting one embodiment of the routine is depicted in FIG. 4.

Figure 4:
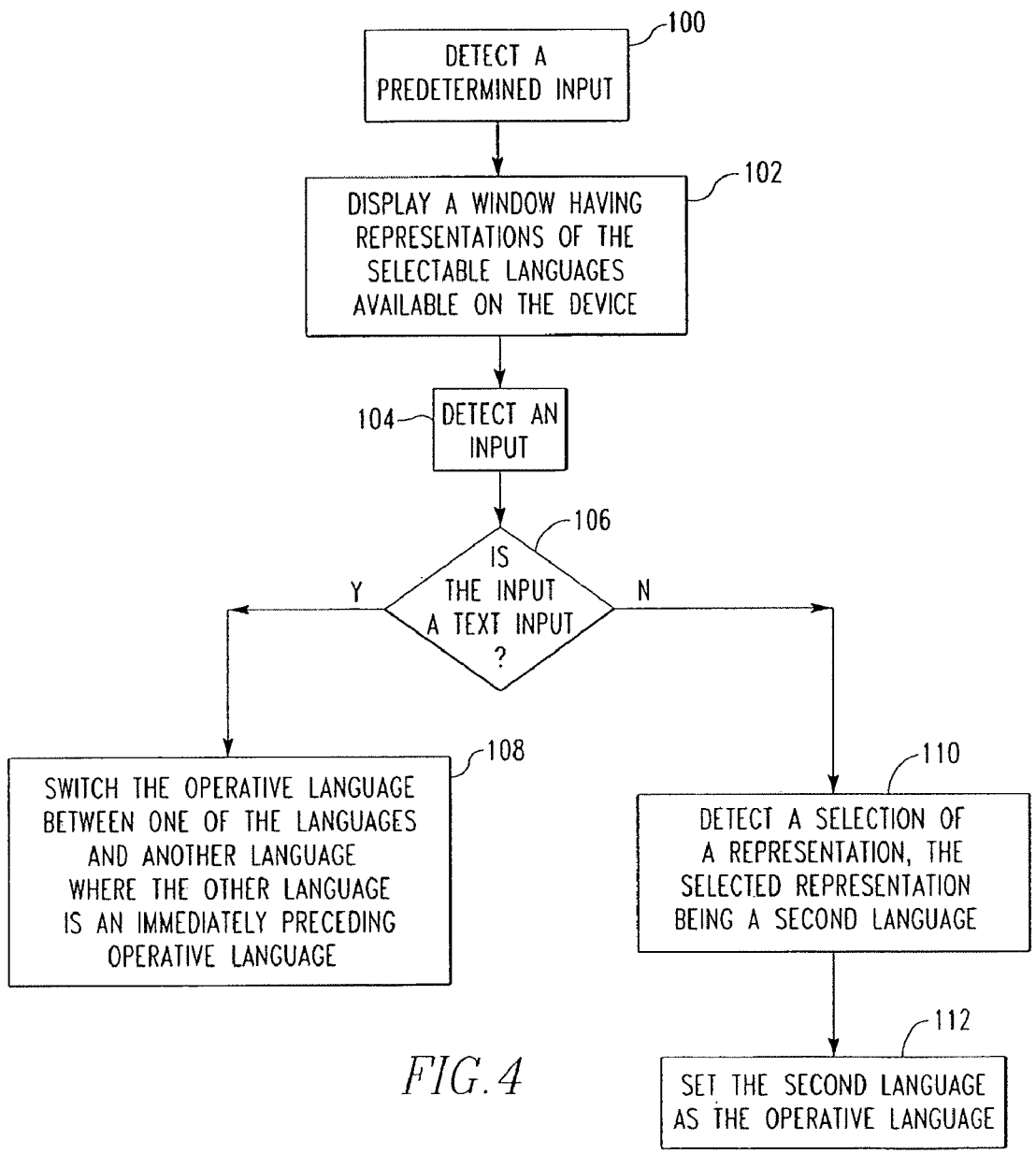
FIG. 4 is a flowchart depicting an embodiment of an improved method in accordance with the disclosed and claimed concept.

As can be understood from FIG. 4, the routine begins at step 100, where the improved handheld electronic device 2 detects a predetermined input. In response to the detection of the predetermined input at step 100, the improved handheld electronic device 2 displays, as at step 102, a window 60 having representations 66 of the selectable languages that are available on the improved handheld electronic device 2. The improved handheld electronic device 2 then detects, as at step 104, an input, and determines, as at step 106, whether the input at step 104 is a text input. If the input, at step 104 is a text input, then the improved handheld electronic device 2 switches, as at step 108, the operative language between one of the languages and another language where the another language is an immediately preceding operative language. If the input, at step 104, is not a text input, then the improved handheld electronic device 2 detects, at step 110, a selection of one of the representations 66 of the languages 50 displayed in the window 60. In response to the selection at step 110, the improved handheld electronic device 2 sets, as at step 112, as the operative language the language (i.e. second language) that corresponds to the selected representation.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A handheld electronic device comprising an input apparatus, a processor apparatus, and an output apparatus, said input apparatus comprising a number of input members, said processor apparatus comprising a processor and a memory having stored therein a plurality of objects comprising a plurality of language objects, said memory having stored therein at least three selectable languages available thereon, one of said at least three selectable languages being an operative language, and another of said at least three selectable languages having been the operative language immediately prior to the one of said selectable languages, said memory also having stored therein a number of routines which, when executed by said processor, causes said handheld electronic device to perform operations comprising:

detecting a predetermined input;

detecting a text input, wherein said text input is output by the output apparatus; and in response to said detecting said text input, switching said operative language between said one of said at least three selectable languages and said another of said at least three selectable languages.

2. The handheld electronic device, according to claim 1 wherein said input members include a plurality of keys and said routine causes said handheld electronic device to perform operations further comprising detecting as said predetermined input a chording actuation of at least two of said keys.

3. The handheld electronic device, according to claim 2 wherein said chording actuation is an actuation of a first key followed by an actuation of a second key.

4. The handheld electronic device, according to claim 2 wherein said chording actuation is a press-and-hold actuation of a first key and an actuation of a second key.

5. The handheld electronic device, according to claim 2 wherein said chording actuation is a press-and-release actuation of a first key and an actuation of a second key.

* * * * *